United States Patent [19]

Sato

[11] Patent Number: 4,520,927
[45] Date of Patent: Jun. 4, 1985

[54] HEAT-SEALABLE PACKAGE BLANK FOR A VIDEO TAPE CASSETTE

[75] Inventor: Yoshihiro Sato, Tokyo, Japan

[73] Assignee: Dai Nippon Insatsu Kabushiki Kaisha, Tokyo, Japan

[21] Appl. No.: 455,944

[22] Filed: Dec. 15, 1982

[30] Foreign Application Priority Data

Jan. 30, 1982 [JP] Japan ............................. 57-10821[U]
Apr. 7, 1982 [JP] Japan ............................. 57-49369[U]
Oct. 5, 1982 [JP] Japan ........................... 57-151220[U]

[51] Int. Cl.³ ......................................... B65D 85/672
[52] U.S. Cl. ..................................... 206/387; 220/76; 229/3.1; 229/33; 229/48 T
[58] Field of Search ......................... 206/387; 220/76; 229/33, 35, 36, 44 R, 48 SA, 48 SC, 48 T, 3.1, 31 R, 32, 16 R, 30; 493/326, 327, 162, 134, 129

[56] References Cited

U.S. PATENT DOCUMENTS

| 1,319,161 | 10/1919 | Miller | 229/32 |
| 1,470,397 | 10/1923 | Smith | 229/32 |
| 3,108,734 | 10/1963 | Hewko | 206/454 X |
| 3,125,280 | 3/1964 | Henry | 229/44 R X |
| 3,361,325 | 1/1968 | Hakansson et al. | 229/33 |
| 3,610,114 | 10/1971 | Kaminsky | 493/134 |

FOREIGN PATENT DOCUMENTS

| 6998 | 4/1933 | Australia | 229/33 |
| 519597 | 5/1953 | Belgium | 229/36 |
| 6406154 | 12/1965 | Netherlands | 229/37 R |
| 879135 | 10/1961 | United Kingdom | 229/31 R |
| 994290 | 6/1965 | United Kingdom | 229/16 R |

Primary Examiner—George L. Lowrance
Assistant Examiner—Gary E. Elkins
Attorney, Agent, or Firm—Parkhurst & Oliff

[57] ABSTRACT

A package blank is made from a single sheet having at least surface layers of heat-sealable material. The blank sheet comprises first and second rectangular panels foldably formed on opposite sides of a backstrip. The first and second panels have first and second pairs of foldable side flaps, respectively, extending from their opposite sides, and the backstrip has a pair of foldable back flaps extending from its opposite ends. The first side flap pair and the back flap pair have sloping edges located adjacent each other for forming at least partly overlapping seams when the blank is folded up into a generally boxlike, open-front package. The overlapping seams serve to prevent the intrusion into the package of heated air used for fusing the second side flap pair onto the first side flap pair and the back flap pair. At least either of the first side flap pair and the back flap pair is at least partly reduced in thickness to minimize the thickness of the overlapping seams and hence to avoid the surface irregularities of the overlying second side flap pair.

1 Claim, 23 Drawing Figures

HEAT-SEALABLE PACKAGE BLANK FOR A VIDEO TAPE CASSETTE

BACKGROUND OF THE INVENTION

The present invention deals with packages, and is directed more specifically to a heat-sealable package blank, or package in semifinished form, particularly well suited for enclosing a video tape cassette or other commodity likely to be damaged by heat used in the fabrication of the package from the package blank.

Video tape cassettes for the recording and replay of television programs are normally housed in generally box-like, forwardly opening packages for protecting the video tape cassettes and, for carrying identification legends and other markings, making the packages more aesthetically appealing to the consumer. The manufacture of such packages starts with the blanking of a relatively stiff sheet, as of paperboard or plastic material, into a desired shape complete with indented folding lines. The thus prepared blanks are then folded up into a boxlike shape, and the flaps are glued or otherwise united together to complete the desired packages. Video tape cassettes are inserted in these packages and, further enveloped in outer coverings, for shipping to the consuming market.

An objection to the above conventional packaging practice is that tape cassettes are inserted into the completed packages. The completed packages are, of course, far more bulky than the package blanks and so present a serious problem in storage and transportation. The insertion of tape cassettes into the packages is also in itself a trouble, taking much time as the packages may not necessarily be dimensioned to fit the cassettes.

It has been known to use sheets of thermoplastic material such as polypropylene, polyethylene or polystyrene, or composite sheets having facings of such thermoplastic material on both sides of a core of paper or the like. In the fabrication of video tape cassette packages from such thermoplastic sheets, the superposed flaps are fused together by heat and pressure or by known ultrasonic or high frequency welding techniques. In either case, however, the fusion of the flaps requires the insertion of bearing plates in the packages, making it impossible to form the packages with the cassettes prereceived therein. This known method limits the amount of packages produced from blanks to only thirty or so packages per minute.

Another known method uses heated air to unite the superposed flaps of the package blanks, in order to dispense with the need for bearing plates and hence make possible the manufacture of the packages with the cassettes prereceived therein. The heated air melts only the opposed surfaces of the superposed flaps, so that they can be fused together when lightly pressed against each other.

Although well calculated to increase the production of packaged cassettes, this known method has hitherto been impracticable by reason of the conventional design of the package blanks. As heretofore designed, the package blanks when folded into the approximate shape of packages, allowed the heated air to intrude into the packages, subsequently thermally deforming and otherwise impairing consequent thermal deformation and other impairment of the tape cassettes housed in the package. This drawback of the prior art package blanks will be later discussed in further detail.

SUMMARY OF THE INVENTION

The present invention seeks to provide improved heat-sealable package blanks of the character defined, so that the blanks can be efficiently processed into packages without inviting thermal damage to video tape cassettes or other commodities prereceived therein.

In attaining the first recited objective, the invention seeks to minimize the surface irregularities of the completed packages and thereby enhance their commercial utility.

Summarized briefly, the invention provides a heat-sealable package blank made of a single sheet having at least surface layers of heat-sealable material. It comprises first and second panels of approximately the same shape and size formed on opposite sides of an elongate backstrip and foldable one over the other into a right-angle relation with the backstrip. The first and second panels have first and second pairs of foldable side flaps, respectively, extending from their opposite sides. The backstrip has a pair of foldable back flaps located between the two pairs of side flaps. Each back flap is substantially in the shape of a right-angled triangle having one of its two right-angular sides joined to the backstrip. The first pair of side flaps each have a sloping edge located adjacent the sloping edge of one of the back flaps. The sloping edges of the back flaps and the first pair of side flaps are so angled in relation to each other that they form at least partly overlapping seams when the package blank is folded into a package. The thickness of these overlapping seams is minimized as the back flaps and the first pair of side flaps have their overlapping portions reduced in thickness.

The package blank of this invention outlined above is folded into a generally boxlike, open-front package with a video tape cassette or the like prereceived therein. The second pair of side flaps are fused to the first side flap pair and the back flap pair by applying forced streams of hot air to their opposed surfaces. Since the first side flap pair and the back flap pair form the overlapping seams at their joints, the heated air stream will not enter the package to damage the contained cassette or the like.

In this embodiment either or both of the first side flap pair and the back flap pair have at least their overlapping portions reduced in thickness to correspondingly reduce the thickness of the overlapping seams. Thus the second side flap pair, heat-sealed as above to the overlapping first side flap pair and back flap pair, will have little or no unevenness on their external surfaces.

The above and other features and advantages of this invention and the manner of attaining them will become more apparent, and the invention itself will best be understood from a study of the following description of some preferred embodiments taken together with the attached drawings.

DESCRIPTION OF THE PREFERRED EMBODIMENTS

Figure 1:
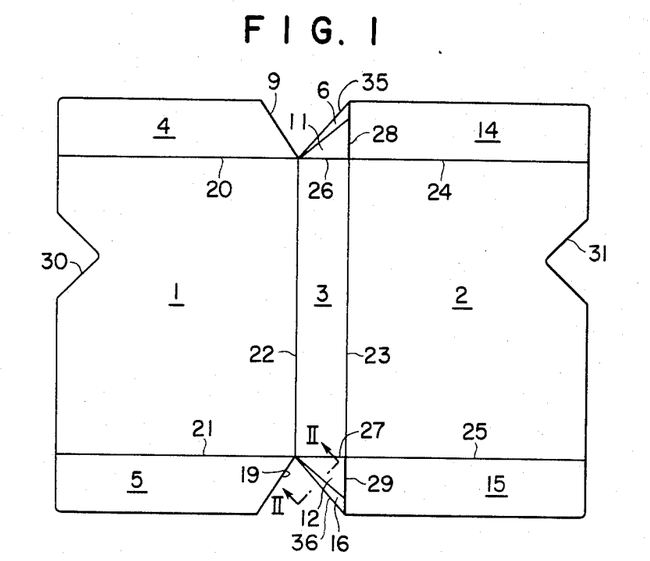
FIG. 1 is a plan of a first preferred form of a package blank designed in accordance with the invention for housing a video tape cassette.

Reference is first directed to FIG. 1 in order to describe the general configuration of the first embodiment of the package blank is adapted for a video tape cassette. In this and all the other embodiments presented subsequently, the package blanks are formed by blanking compressed sheets of polypropylene foam with a thickness typically ranging from 0.5 to 1.0 millimeter. It is of course understood that other thermoplastic sheet materials are adoptable within the scope of the invention, including those having only surface layers of heat-sealable material.

The package blank of FIG. 1 comprises first and second panels 1 and 2 of generally rectangular shape formed on opposite sides of an elongate backstrip 3. The two panels 1 and 2 are sized to suit the opposite main faces of a video tape cassette to be packaged. Thus, the panels can be of approximately the same shape and size. Strictly speaking, however, the longitudinal dimension of the second panel 2 is greater than that of the first panel 1 by twice the thickness of the polypropylene sheet of which is made the package blank. The backstrip 3 has a width corresponding to the thickness of the tape cassette.

Extending from opposite sides of the first and second panels 1 and 2, at right angles to the backstrip 3, are a first pair of side flaps 4 and 5 and a second pair of side flaps 14 and 15, respectively. These side flaps have a width, or a dimension in the longitudinal direction of the backstrip 3, corresponding to the thickness of the tape cassette. The first pair of side flaps 4 and 5 have sloping edges 9 and 19 in the vicinities of the backstrip 3.

The backstrip 3 has a pair of back flaps 11 and 12 extending from its opposite longitudinal ends to the same extent as the first and second pairs of side flaps from the first and second panels. Each back flap is herein shown to be in the shape of a right-angled triangle, with one of its two right-angular sides joined to the back strip 3 and the other side held opposite to one of the second pair of side flaps 14 and 15. Consequently the back flaps 11 and 12 have sloping edges 35 and 36 directed toward the sloping edges 9 and 19, respectively, of the first pair of side flaps 4 and 5.

It will be noted that the sloping edges 9 and 19 of the first pair of side flaps 4 and 5 and the sloping edges 35 and 36 of the back flaps 11 and 12 are inclined away from each other as they extend in the opposite directions away from the first panel 1 and from the backstrip 3. The sloping edges 9 and 19 and the sloping edges 35 and 36 are so angled in relation to each other as to form triangularly overlapping seams when the package blank is folded into a generally boxlike, forwardly opening package, as will be later discussed in greater detail.

Figure 2:
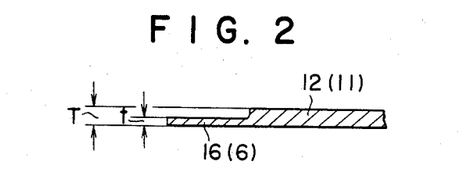
FIG. 2 is an enlarged section of one of the back flaps of the package blank, the section taken along the line II—II of FIG. 1.

In this embodiment, in order to minimize the thickness of the noted overlapping seams, the pair of back flaps 11 and 12 are reduced in thickness at triangular portions 6 and 16, along the sloping edges 35 and 36. As better shown in FIG. 2, the thickness t of the triangular portions 6 and 16 is considerably less than the thickness T of the rest of the back flaps 11 and 12. These reduced thickness portions of the back flaps are intended to lap over the sloping edges 9 and 19 of the first pair of side flaps 4 and 5.

All the constituent panels, the backstrip, and the flaps of the package blank must be readily foldable with respect to each other. To this end there are provided indented folding lines 22 and 23 between the panels 1 and 2 and the backstrip 3, indented folding lines 20 and 21 between the first panel 1 and the first pair of side flaps 4 and 5, indented folding lines 24 and 25 between the second panel 2 and the second pair of side flaps 14 and 15, and indented folding lines 26 and 27 between the backstrip 3 and the pair of back flaps 11 and 12. Cuts 28 and 29 are formed between the pair of back flaps 11 and 12 and the second pair of side flaps 14 and 15.

At 30 and 31 in FIG. 1 are shown notches formed in the panels 1 and 2. These notches come into register with each other when the package blank is processed into a video tape cassette package, and so serve to make easier the manipulation of the cassette out of the package.

Figure 3:
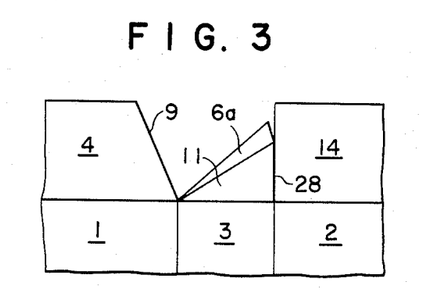
FIG. 3 is an enlarged, fragmentary plan of the package blank of FIG. 1. This view shows one of the back flaps in a state before part of the back flap is depressed to provide a reduced thickness portion.
Figure 4:
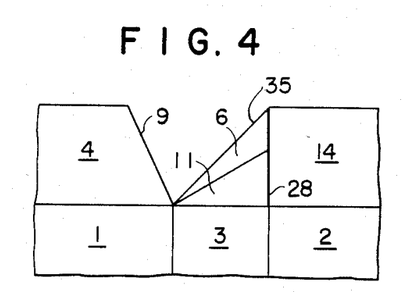
FIG. 4 is a view similar to FIG. 3, except that the back flap is shown in a state after the creation of the reduced thickness portion.

FIGS. 3 and 4 are explanatory of a method of making the triangular reduced-thickness portions 6 and 16 of the back flaps 11 and 12. As seen in FIG. 3, the representative back flap 11 is formed complete with a triangular portion 6a of the same thickness but with a smaller area than that of the desired reduced-thickness portion 6, at the time of the blanking of the sheet material. Then heat and pressure are applied to the triangular portion 6a to reduce its thickness to t (FIG. 2) and to increase its size into the desired reduced-thickness portion 6 depicted in FIG. 4. The other reduced thickness portion 16 can of course be produced in a like manner. The heat and pressure applied as above may be suitably controlled to obtain the reduced thickness portions 6 and 16 of the desired surface area and thickness.

The following is a discussion, with reference directed to FIGS. 5 through 8, of the procedure of fabricating a video tape cassette package from the package blank of the above construction. The complete fabricating process can be automatic.

Figure 5:
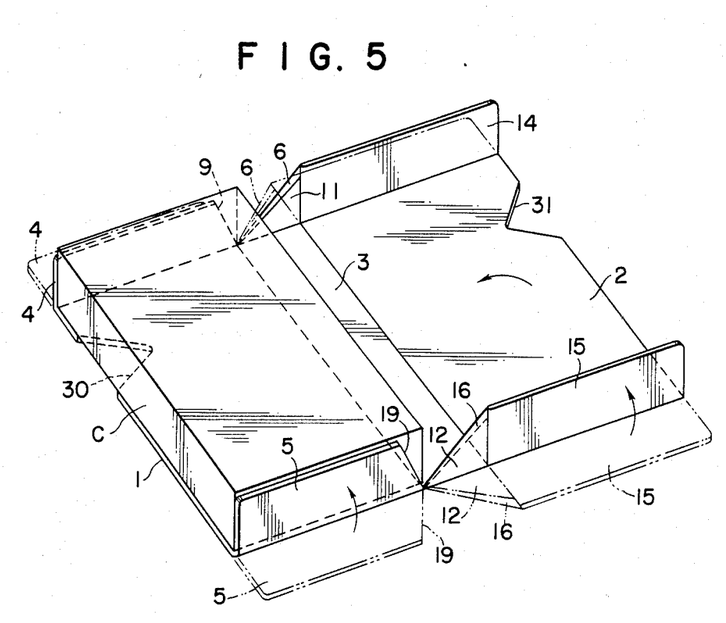
FIG. 5 shows in perspective, the package blank of FIG. 1 with its flaps folded in the act of being processed into a package for the video tape cassette already placed in position on one of the two panels of the blank.

First, as pictured in FIG. 5, the first pair of side flaps 4 and 5, the second pair of side flaps 14 and 15, and the pair of back flaps 11 and 12 of the package blank are all folded upwardly into approximately right-angular relation with the first and second panels 1 and 2 and the backstrip 3, while the package blank is being conveyed on a belt conveyor V (FIG. 7) so as to travel with its second panel 2 foremost. Then the video tape cassette C to be packaged is deposited in position on the first panel 1 of the travelling package blank.

Figure 6:
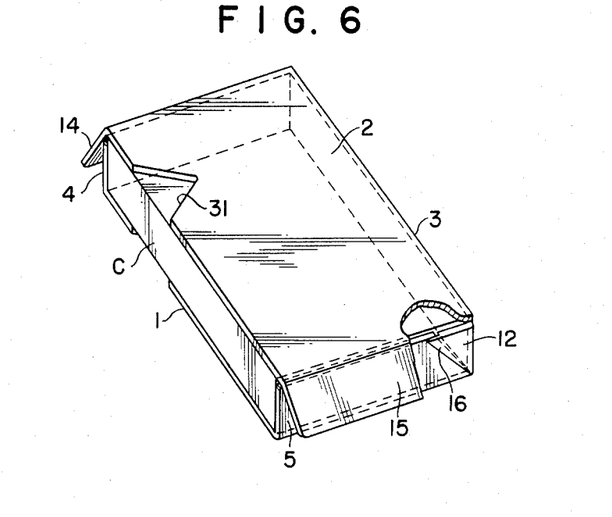
FIG. 6 shows in perspective, the package blank of FIG. 1, with the two panels subsequently folded over the video tape cassette.
Figure 7:
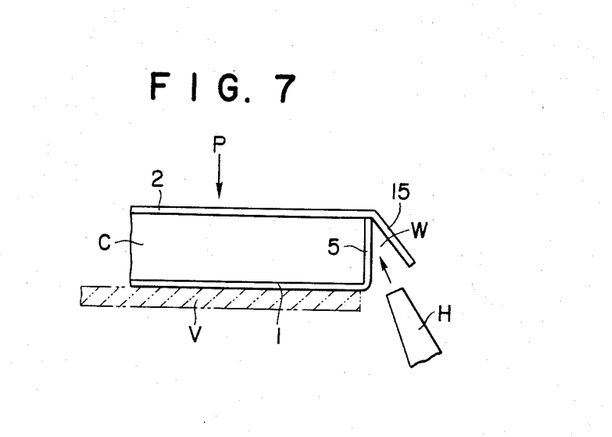
FIG. 7 is a diagrammatic representation explanatory of the way in which the package blank, folded as in FIG. 6, is heat-sealed with use of heated air to complete the video tape cassette package.
Figure 8:
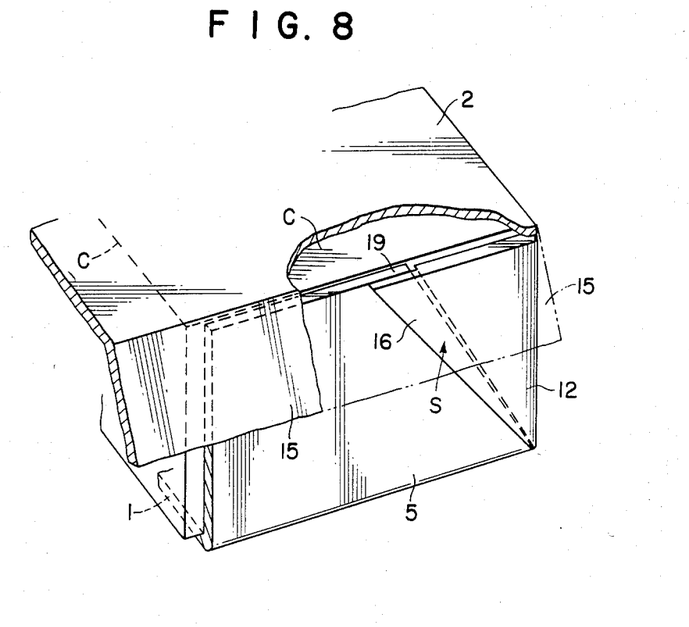
FIG. 8 is an enlarged, fragmentary perspective view of the package blank folded as in FIG. 6. The package blank is shown partly broken away to reveal one of the overlapping seams.

Next the second panel 2 is folded so that backstrip 3 abut against the back of the tape cassette C and the second panel becomes flat against the tape cassette. This state is represented in FIG. 6. As illustrated on an enlarged scale in FIG. 8, the reduced thickness portions 6 and 16 of the back flaps 11 and 12 come to overlie the sloping edges 9 and 19 of the first pair of side flaps 4 and 5 thereby forming the overlapping seams S.

It will be seen that the folded flaps tend to return to their initial positions. Thus, as the folding forces on the second pair of side flaps 14 and 15 are released in the state of FIGS. 6 and 8, these side flaps resiliently turn away from the first pair of side flaps 4 and 5 and the back flaps 11 and 12 and come to stay at an angle thereto as shown in these figures.

The next step is the heat-sealing of the second pair of side flaps 14 and 15 to the first pair of side flaps 4 and 5 and to the back flaps 11 and 12. Provided for this purpose are a pair of flat nozzles, one shown at H in FIG. 7, disposed on both sides of the belt conveyor V and directed upwardly to expel heated air out into the entire wedge-shaped spaces between the second pair of side flaps 14 and 15 and the first pair of side flaps 4 and 5 and back flaps 11 and 12. The heated air may have a temperature of, say, 300° C. through 500° C. and may be expelled for approximately 0.5 seconds. The forced streams of such heated air melt the opposed surfaces of the second pair of side flaps 14 and 15 and the first pair of side flaps 4 and 5 and back flaps 11 and 12. Immediately after the application of the heated air, the second pair of side flaps 14 and 15 are pressed against the first pair of side flaps 4 and 5 and back flaps 11 and 12 by suitable means, not shown, uniting them. Thus the fabrication of one package is completed, as well as the packaging of one video tape cassette. During the above heat-sealing operation a pressure should be held applied to the second panel 2 in the direction of the arrow P in FIG. 7 to maintain the contact of the second panel with the top of the tape cassette C.

It will be appreciated that the overlapping seams S formed by the sloping edges of the first pair of side flaps and the sloping edges of the back flaps serve to prevent the intrusion of the heated air into the package. Further, since the inside surfaces of the package are not unduly heated by the heated air, the tape cassette contained therein is amply protected from thermal damage. The heated air will not enter the package over the top edges of the folded first pair of side flaps and folded back flaps, either, as the second panel is held against these top edges by the pressure exerted thereon in the direction of the arrow P.

The temperature, pressure and amount of the heated air for heat-sealing each package as above are of course subject to change depending upon the material, shape, size, thickness, etc., of the package blank. Generally speaking, the above process will make possible the automatic packaging of video tape cassettes at a rate of 100 or more per minute, as compared with 30 or so per minute according to the conventional practice making use of pressure bearing plates.

Figure 22:
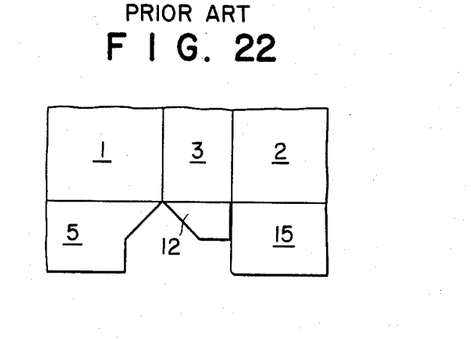
FIG. 22 is a fragmentary plan of a typical prior art package blank for a video tape cassette.
Figure 23:
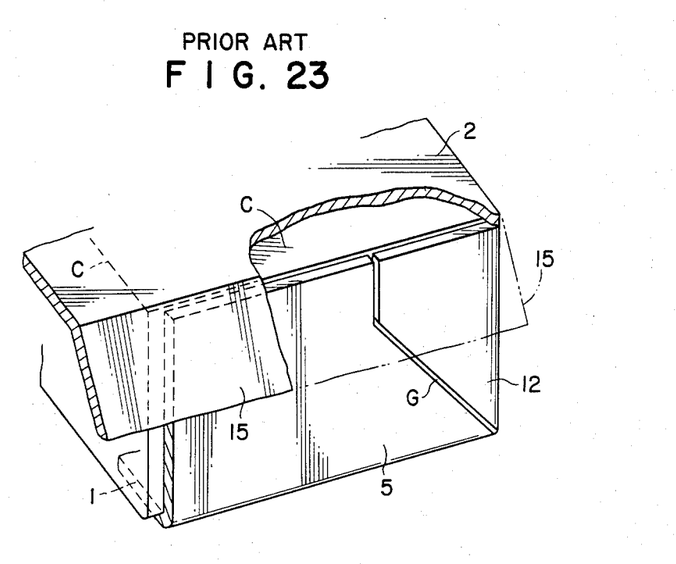
FIG. 23 is a view similar to FIGS. 8, 10, 12 and 14 showing the prior art package blank of FIG. 22 folded up to contain a video tape cassette.

It should be noted that the pneumatic heat-sealing operation explained in the foregoing becomes practicable only with use of the improved package blank of this invention, which when folded, forms overlapping seams between the pair of back flaps and the first pair of side flaps. The corresponding flaps of the prior art package blank have been shaped as shown in FIG. 22. When folded as in FIG. 23, the flaps form butt seams G, one shown, unavoidably having gaps between the butting edges. These gaps allow intrusion of heated air into the package and so invite damage to the prereceived video tape cassette C.

A further pronounced feature of the package blank shown in FIGS. 1 through 8 resides in the reduced thickness portions 6 and 16 of the back flaps 11 and 12. These portions function to correspondingly reduce the thickness of the overlapping seams S made with the sloping edges 9 and 19 in the first pair of side flaps. This reduction of the thickness of the overlapping seams is of course effective to minimize the surface irregularities of the overlying second pair of side flaps 14 and 15 and hence improves the appearance of the completed package.

In this particular embodiment, the overlapping seams S are not exactly equal in thickness to the other portions of the back flaps 11 and 12 and the first pair of side flaps 4 and 5. Accordingly, upon heat-sealing of the second pair of side flaps 14 and 15, the first pair of side flaps 4 and 5 slightly bulge inwardly at the overlapping seams S. Such slight inward bulging of the side flaps serves to firmly but yieldably retain the tape cassette C in place within the package, preventing the cassette from readily slipping out of the package.

Figure 9:
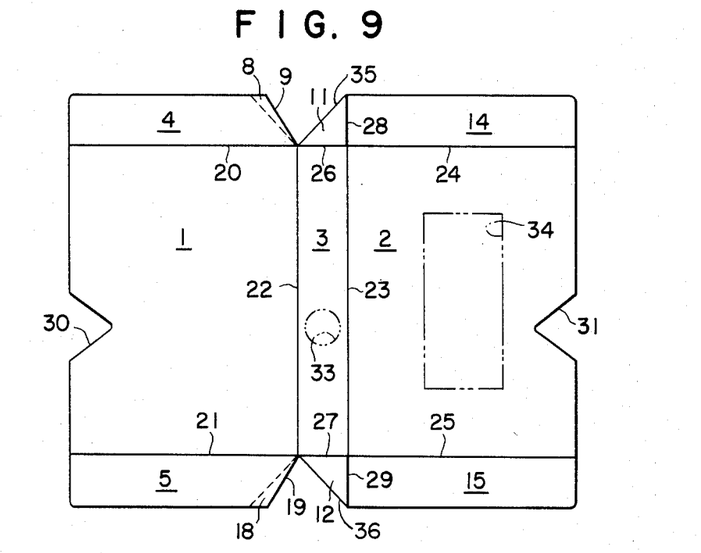
FIG. 9 is a plan of a second embodiment of the package blank in accordance with the invention. In this embodiment the heat sealable package blank is adapted for housing a video tape cassette.
Figure 10:
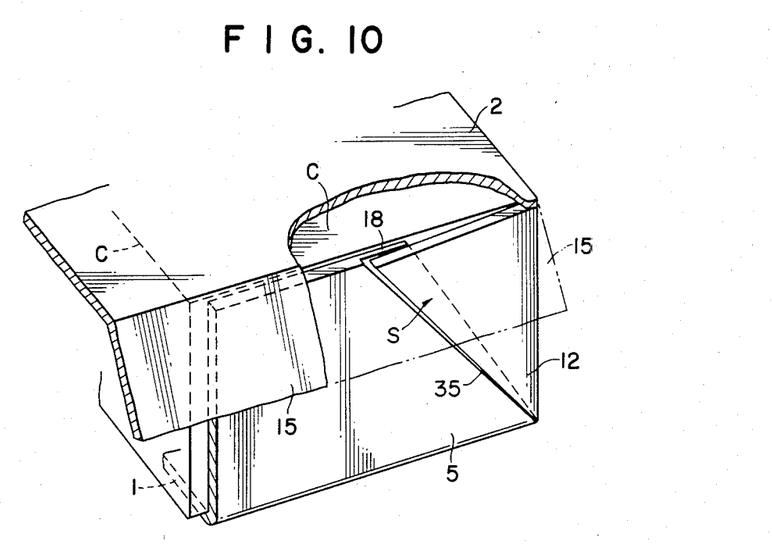
FIG. 10 is a view similar to FIG. 8 showing the package blank of FIG. 9 folded up to contain a video tape cassette.

FIG. 9 illustrates another embodiment of the package blank in accordance with the invention, alternative to the package blank of FIGS. 1 through 8. In this alternative embodiment, the first pair of side flaps 4 and 5, not the pair of back flaps 11 and 12 as in the preceding embodiment, have reduced thickness portions 8 and 18 of triangular shape along their sloping edges 9 and 19. When the package blank is folded as in FIG. 10, the sloping edges 35 and 36 of the back flaps 11 and 12 lap over the reduced thickness portions 8 and 18 of the first pair of side flaps 4 and 5 thereby forming the desired overlapping seams S of reduced thickness. These overlapping seams afford the same advantages as those set forth above in conjunction with the first embodiment.

The embodiment of FIG. 9 is also shown to have a circular opening 33 formed through the backstrip 3. The opening 33 is intended for pushing the video tape cassette out of the package by inserting a fingertip therein. With this opening formed through the backstrip, a pair of notches 30 and 31 may or may not be cut in the panels 1 and 2.

Optionally, a window may be formed in one or each of the panels 1 and 2, as depicted by phantom outline and reference numeral 34 in FIG. 9. Covered with a sheet of transparent material, the window 34 is intended to enable the user or purchaser to see the markings on the contained tape cassette.

Figure 11:
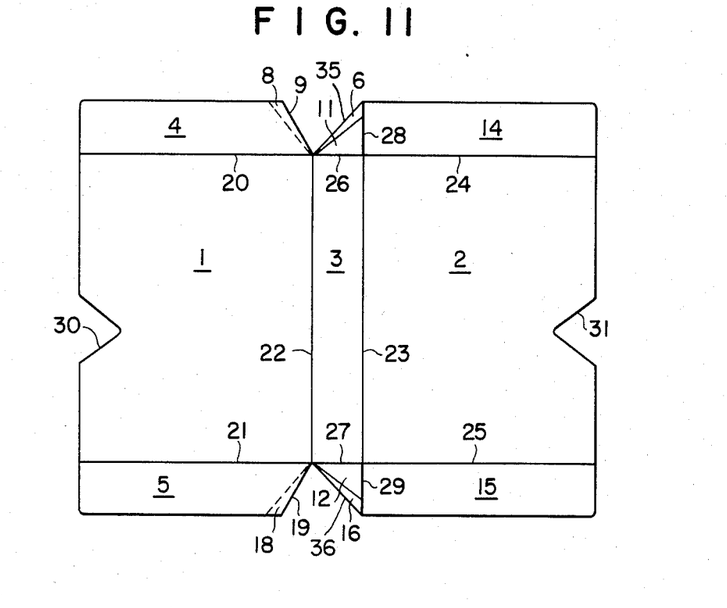
FIG. 11 is a plan of a third embodiment of the package blank wherein the invention is adapted to house a video tape cassette.
Figure 12:
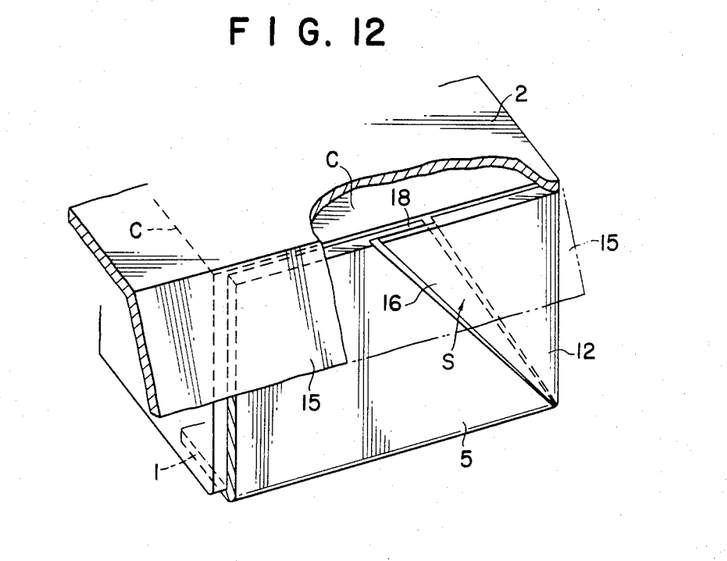
FIG. 12 is a view similar to FIGS. 8 and 10 showing the package blank of FIG. 11 folded up to contain a video tape cassette.

In FIGS. 11 and 12 is given another embodiment of the invention which in essence is the combination of the two preceding embodiments. As seen in FIG. 11, the pair of back flaps 11 and 12 have reduced thickness portions 6 and 16 of triangular shape formed along their sloping edges 35 and 36. The first pair of side flaps 4 and 14 also have reduced thickness portions 8 and 18 of triangular shape formed along their sloping edges 9 and 19. It will be observed that the back flaps 11 and 12 have their reduced thickness portions 6 and 16 formed by indenting their inside surfaces, whereas the first pair of side flaps 4 and 14 have their reduced thickness portions 8 and 18 formed by indenting their outside surfaces.

Thus, when the package blank of FIG. 11 is folded as in FIG. 12, the reduced thickness portions 6 and 16 of the back flaps 11 and 12 and the reduced thickness portions 8 and 18 of the first pair of side flaps 4 and 14 neatly inter-engage to make up the desired overlapping seams S. The thickness of these overlapping seams can be made approximately equal to the other portions of the back flaps and the first pair of side flaps by setting the thickness of each reduced thickness portion at about one half the thickness of the polypropylene sheet of which the package blank is made. In this manner the outward bulging of the overlying second pair of side flaps is thoroughly avoided, so that this embodiment is most desirable from an aesthetic point of view.

Figure 13:
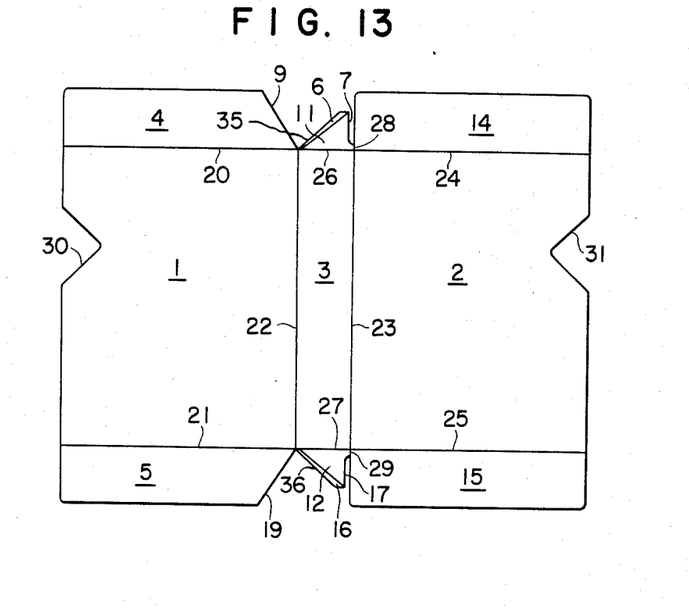
FIG. 13 is a plan of a fourth embodiment of the package blank wherein the invention is adapted to house a video tape cassette.
Figure 14:
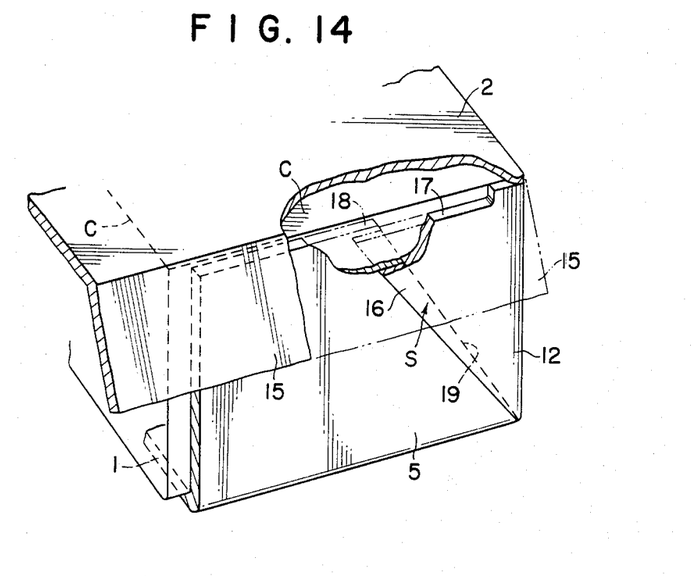
FIG. 14 is a view similar to FIGS. 8, 10 and 12 showing the package blank of FIG. 13 folded up to contain a video tape cassette.

A further embodiment of the invention shown in FIGS. 13 and 14 is analogous with that of FIGS. 1 through 8 in having the reduced thickness portions 6 and 16 of triangular shape along the sloping edges 35 and 36 of the back flaps 11 and 12. This embodiment features a pair of recesses 7 and 17 formed in the pair of back flaps 11 and 12, respectively. It has been stated that each back flap is in the shape of a right-angled triangle with one of its two right-angular sides joined to the backstrip 3. Each recess 7 or 17 is formed along the other of the two right-angular sides, extending from the outer end of one back flap and terminating short of its inner end. This embodiment is identical in the other structural and functional details with that of FIGS. 1 through 8. The function of the recesses 7 and 17 in the back flaps will become clear from a study of the immediately following paragraphs.

As the package blank is machined folded into boxlike shape, the resulting package will almost inevitably become more or less distorted, even if the constituent panels and flaps of the package blank have initially the exact dimensions required. Let it be assumed that the pair of back flaps 11 and 12 are not recessed at 7 and 17. Then, as indicated by the phantom lines in FIG. 15, the back flaps may protrude beyond the top edges of the first pair of side flaps, although the protrusions of the back flaps are drawn somewhat exaggerated in this figure. Such upward protrusions of the back flaps will also occur when dimensional errors occur in the fabrication of the package blank. The back flap protrusions interfere with the second panel 2 and the second pair of side flaps 14 and 15 subsequently folded thereover, cause warpage thereof even after the package is completed.

Figure 15:
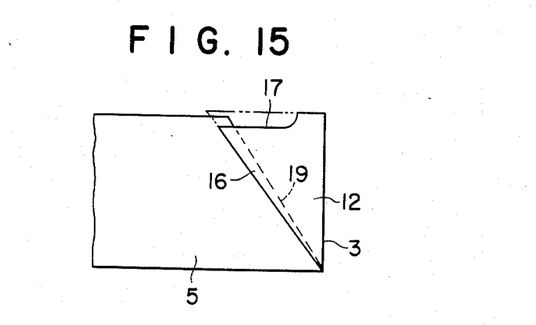
FIG. 15 is a fragmentary side view of a folded package, the view being explanatory of the advantage of the package blank of FIGS. 13 and 14.

As represented by the solid lines in FIG. 15 and in partly broken-away perspective in FIG. 14, the recesses 7 and 17 in the back flaps 11 and 12 serve to prevent the upward protrusion thereof in spite of folding errors or some initial dimensional errors of the package blank. The production of defective packages is thus drastically reduced.

Figure 16:
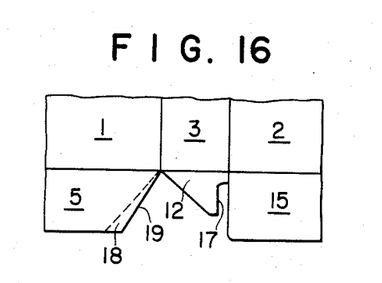
FIG. 16 is a fragmentary plan of a slight modification of the package blank of FIGS. 9 and 10.
Figure 17:
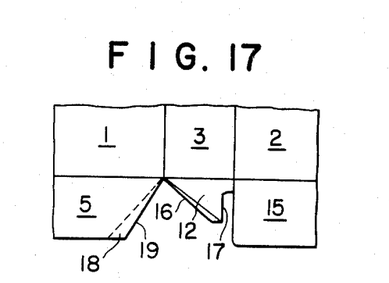
FIG. 17 is a fragmentary plan of a slight modification of the package blank of FIGS. 11 and 12.

From the above explained function of the recesses 7 and 17, it is clear that not only the embodiment of FIG. 1 through FIG. 8, but the other embodiments disclosed hereinbefore can have similar recesses formed in the back flaps. Thus, in the package blank of FIG. 16, each back flap 12 is recessed at 17 but has no reduced thickness portion; instead, each of the first pair of side flaps 5 has the reduced thickness portion 18 along its sloping edge 19 as in the embodiment of FIGS. 9 and 10. The package blank of FIG. 17 is similar to that of FIGS. 11 and 12 in having the reduced thickness portions 16 and 18 provided both on the pair of back flaps 12 and on the first pair of side flaps 5. The back flaps are further recessed at 17.

FIGS. 18 through 21 illustrate additional examples of package blanks all having the recesses formed in their back flaps, as represented by the numeral 17, but having different types of reduced thickness portions formed on either or both of the first pair of side flaps and the pair of back flaps.

Figure 18:
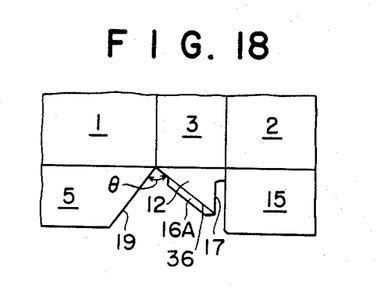
FIGS. 18, 19, 20 and 21 are fragmentary plans of additional modifications of the package blank in accordance with the invention.

The package blank of FIG. 18 is similar to that of FIGS. 13 and 14 except that the former has a band-shaped reduced thickness portion 16A formed along the sloping edge 36 of each back flap 12. Protruding from the sloping edge 36, the reduced thickness portion 16A extends from its outer extremity and terminates short of its inner extremity. The angle $\theta$ between the sloping edge 36 of each back flap 12 and the adjacent sloping edge 19 of one side flap 5 is set at 90 degrees.

When the package blank of FIG. 18 is folded into a package, the band-shaped reduced thickness portions 16A of the back flaps entirely overlap the first pair of side flaps 5. The sloping edge portions of the back flaps having no reduced thickness portions butt on the corresponding parts of the sloping edges 19 of the first pair of side flaps. Thus the first pair of side flaps and the pair of back flaps form partly overlapping seams practically impervious to forced streams of heated air used for heat-sealing the second pair of side flaps thereto.

Figure 19:
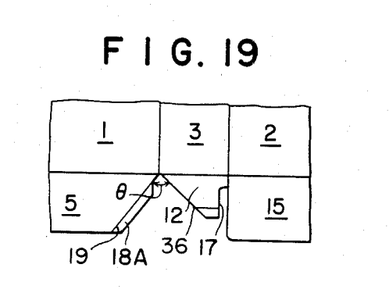

In the package blank of FIG. 19, each of the first pair of side flaps 5 has a band-shaped reduced thickness portion 18A formed along and protruding from its sloping edge 19. The reduced thickness portion 18A extends from the outer extremity of the sloping edge 19 and terminates short of its inner extremity. The angle $\theta$ between the sloping edges 19 and 36 of the adjacent flaps 5 and 12 is set at 90 degrees. Accordingly, when this package blank is folded up, the first pair of side flaps and the pair of back flaps form partly overlapping seams as in the embodiment of FIG. 18.

Figure 20:
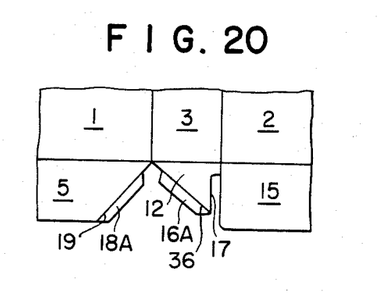

The package blank of FIG. 20 is essentially the combination of the package blanks of FIGS. 18 and 19, having the band-shaped reduced thickness portions 16A and 18A along the sloping edges 36 and 19 of the back flaps and the first pair of side flaps. These flaps also form partly overlapping seams when the package blank is folded up.

Figure 21:
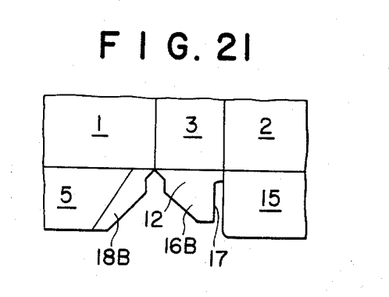

FIG. 21 illustrates an additional example of a package blank embodying portions of the back flaps with reduced thickness and a first pair of side flaps which is not triangular or rectangular as in the embodiments disclosed hereinbefore. Thus, in the package blank of FIG. 21, the first pair of side flaps 5 have a reduced thickness portion 18B of the illustrated shape occupying a greater area thereof than the reduced thickness portions of the foregoing embodiments. Each back flap 12, on the other hand, is reduced in thickness in its entirety, as identified by the reference characters 16B.

Although the invention has been shown and described hereinabove in terms of several preferable embodiments thereof, it is understood that these are meant purely to illustrate or explain and not to impose limitations upon the invention. A variety of modifications or changes will readily occur to one skilled in the art within the broad teaching hereof. For instance, while the reduced thickness portions 6 and 16 of the back flaps in the embodiment of FIGS. 1 through 8 are formed by depressing the flap surfaces to be directed inwardly of the completed package, such portions could be formed by depressing the opposite flap surfaces. In this case, however, the reduced thickness portions of the back flaps must be placed inside the sloping edges of the first pair of side flaps to form overlapping seams, as will be seen upon consideration of FIG. 8.

What is claimed is:

1. A container for a prereceived video tape cassette formed from a single polypropylene sheet having surface layers of heat-sealable nature, said container comprising:

a backstrip;

first and second panels disposed on opposite sides of said backstrip and folded into a right-angle relation with said backstrip and into a parallel relation with each other;

a pair of substantially triangular back flaps disposed between said first and second panels, extending from said backstrip, and folded into a right-angle relation with said backstrip and said panels and each member of said pair of back flaps further comprising a sloping edge along one side adjacent said first panel and a recess disposed along another side adjacent said second panel;

a first pair of side flaps disposed between said first and second panels, extending from opposite sides of said first panel, and folded into a right-angle relation with said first panel, each member of said first pair of side flaps further comprising a sloping edge extending along said sloping edge of each member of said pair of back flaps;

partially overlapping seams formed at a joining location of said sloping edge of each member of said back flaps and each member of said first pair of side flaps, each of said seams including a band-shaped portion extending along a portion of said sloping edge of each member of said back flaps and overlapping each member of said first pair of side flaps without being sealed thereto, each band-shaped portion having a substantially uniform reduced thickness that is less than the thickness of said back flaps and each band-shaped portion terminating prior to the end of said sloping edge of each member of the back flaps adjoining the backstrip;

a second pair of side flaps defining a first surface disposed to overlie a second surface defined by said back flaps and said first pair of side flaps, said second pair of side flaps extending from opposite sides of said second panel and folded into a right-angle relation with said second panel; and heat-sealed seams formed between first and second opposing surfaces of said first pair of side flaps, said back flaps and said second pair of side flaps whereby said overlapped seams prevent intrusion of heat into said container so as to protect said prereceived video tape cassette.

* * * * *